United States Patent [19]

Dominguez

[11] Patent Number: 4,620,771

[45] Date of Patent: Nov. 4, 1986

[54] COMBINED SOLAR TRACKING REFLECTOR AND PHOTOVOLTAIC PANEL

[75] Inventor: Richard L. Dominguez, Phoenix, Ariz.

[73] Assignee: So-Luminaire Systems Corp., San Diego, Calif.

[21] Appl. No.: 648,185

[22] Filed: Sep. 6, 1984

[51] Int. Cl.[4] .................. G02B 17/00; F24J 2/38; H01L 25/00; H02N 6/00

[52] U.S. Cl. .................. 350/258; 126/424; 136/246; 350/264

[58] Field of Search ............ 126/424; 136/246; 350/258–265

[56] References Cited

U.S. PATENT DOCUMENTS

| | | | |
|---|---|---|---|
| 668,404 | 2/1901 | Hanneborg | 350/264 |
| 1,254,520 | 1/1918 | Macduff | 350/264 |
| 3,709,583 | 1/1973 | Pfannkuch et al. | 350/260 |
| 4,114,186 | 9/1978 | Dominguez | 362/35 |
| 4,126,379 | 11/1978 | Wu | 350/260 |
| 4,146,784 | 3/1979 | Yekutieli | 250/203 |
| 4,225,781 | 9/1980 | Hammons | 205/203 |
| 4,266,530 | 5/1981 | Steadman | 126/424 |
| 4,295,621 | 10/1981 | Siryj | 248/183 |
| 4,297,000 | 10/1981 | Fries | 350/96.24 |
| 4,349,245 | 9/1982 | Kliman | 350/264 |
| 4,429,952 | 2/1984 | Dominguez | 350/258 |

OTHER PUBLICATIONS

"Solar Electricity: The Hybrid System Approach" by M. A. Duguay, American Scientist, vol. 65, Jul.-Aug. 1977, pp. 422–427.

Primary Examiner—Richard A. Wintercorn
Attorney, Agent, or Firm—Cahill, Sutton & Thomas

[57] ABSTRACT

A solar lighting apparatus is disclosed for illuminating the interior of roofed building while simultaneously generating electrical power from one or more photovoltaic panels secured to the reflector apparatus for rotation therewith to track daily movements of the sun. The photovoltaic panels may be pivotally supported by the hinged reflector of the reflector apparatus and may be slidingly secured to a track for allowing the photovoltaic panels to fold to a horizontal position when the reflector apparatus is closed. Alternatively, arrays of photovoltaic panels may be supported on opposite sides of the reflector apparatus by brackets secured to a lower frame member of the reflector apparatus. A wind detection apparatus is also disclosed for simulating the onset of darkness during the existence of dangerously high winds.

18 Claims, 22 Drawing Figures

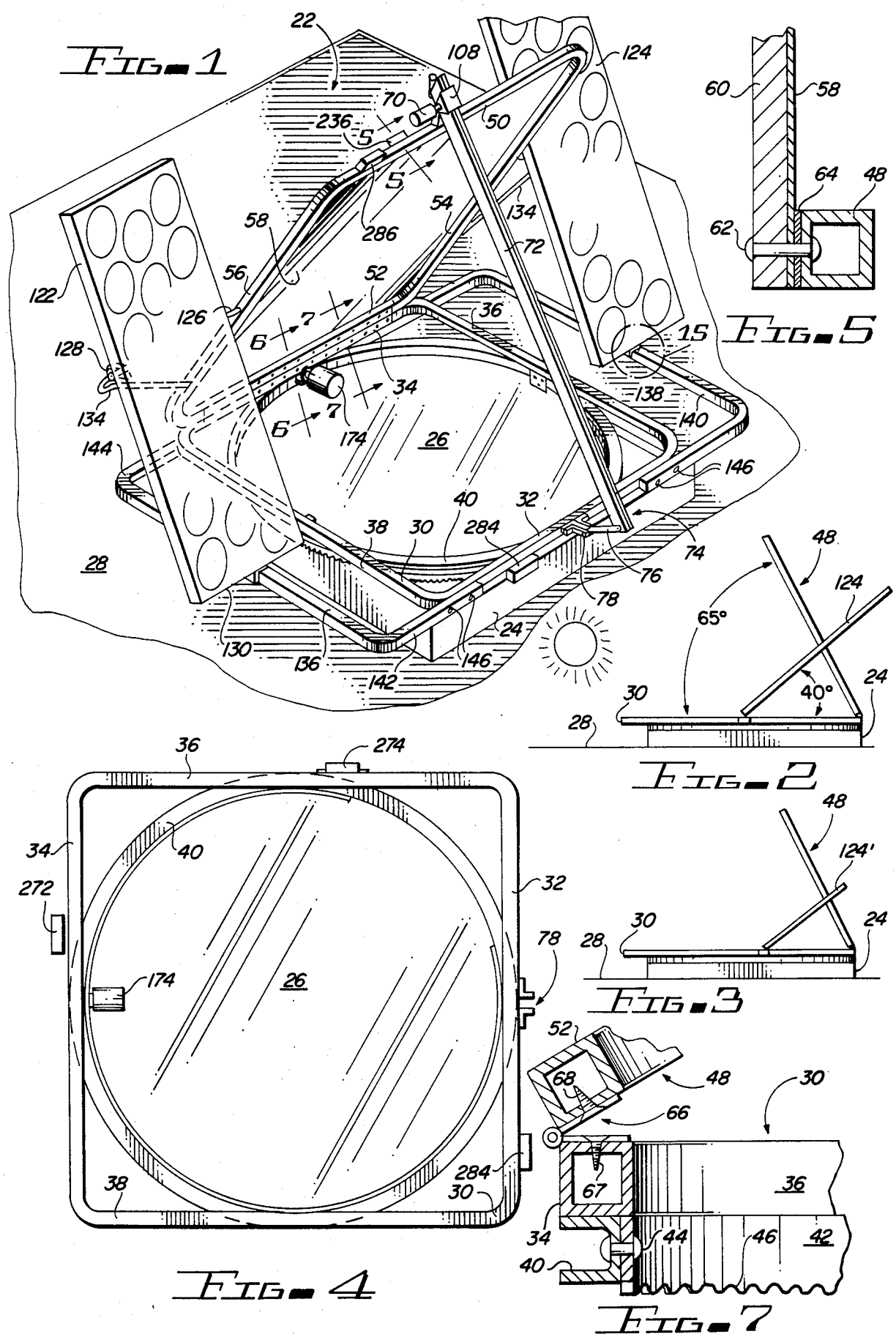

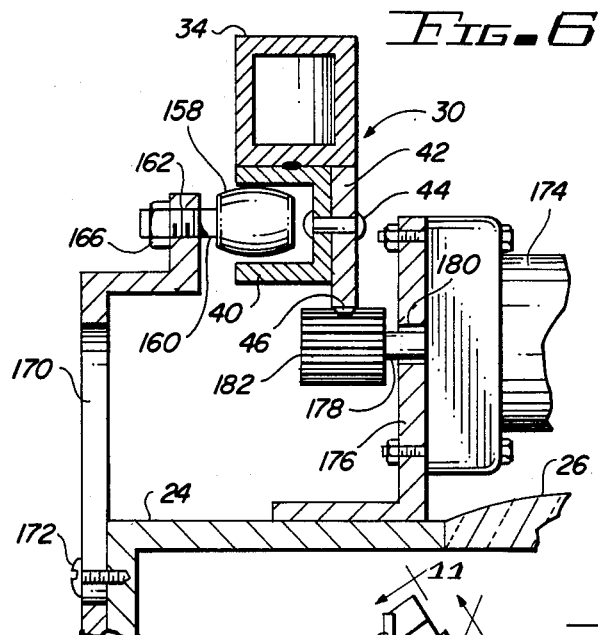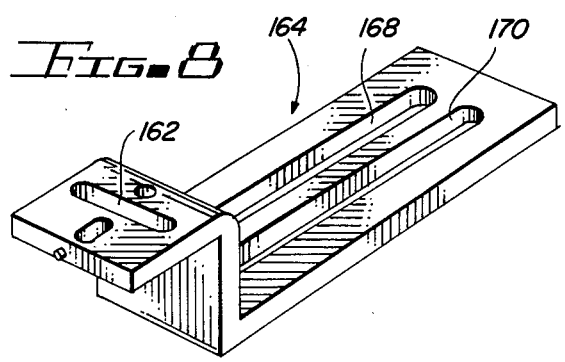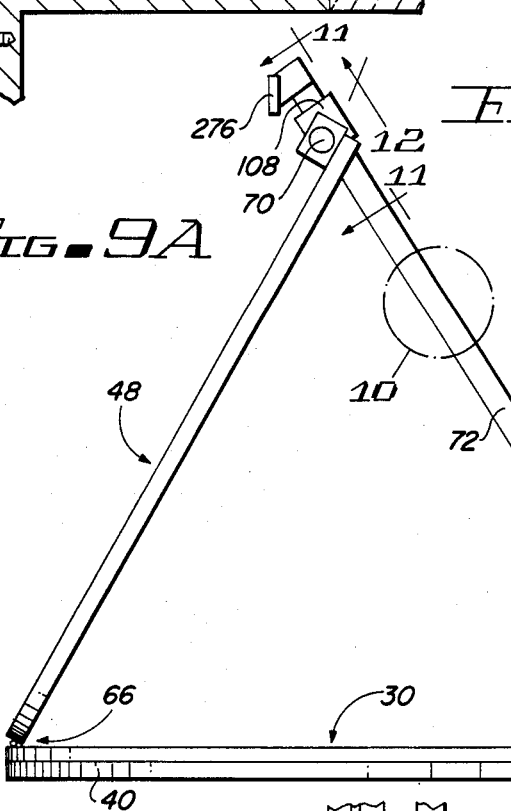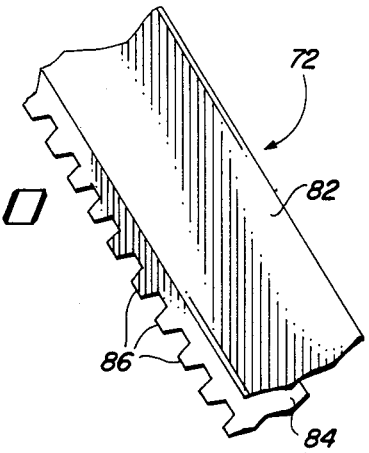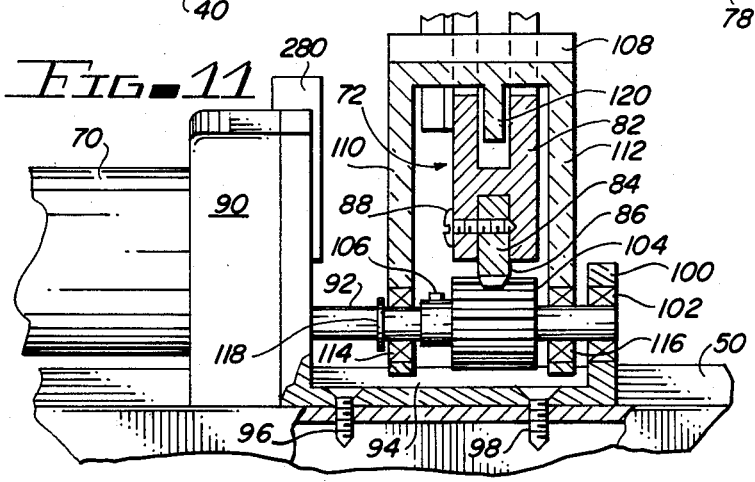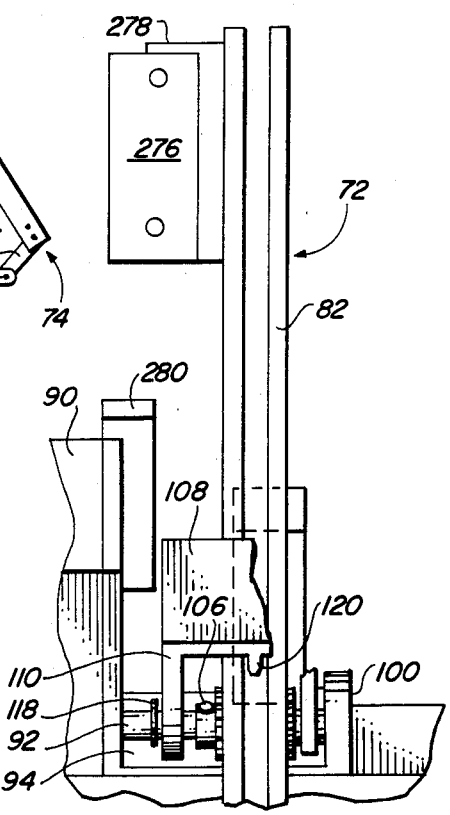

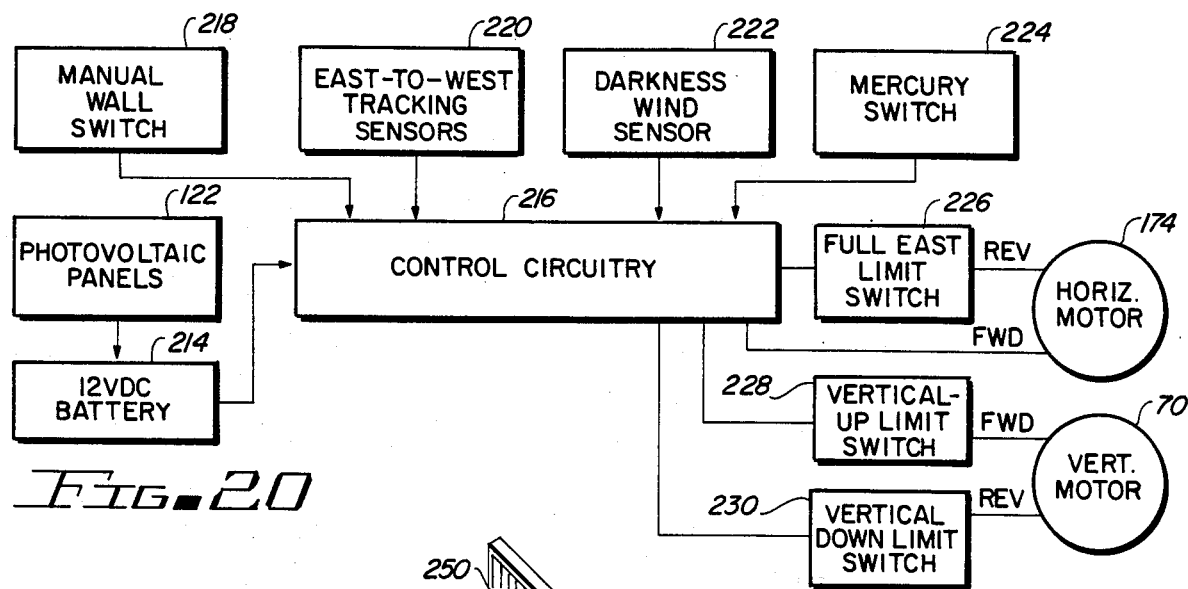
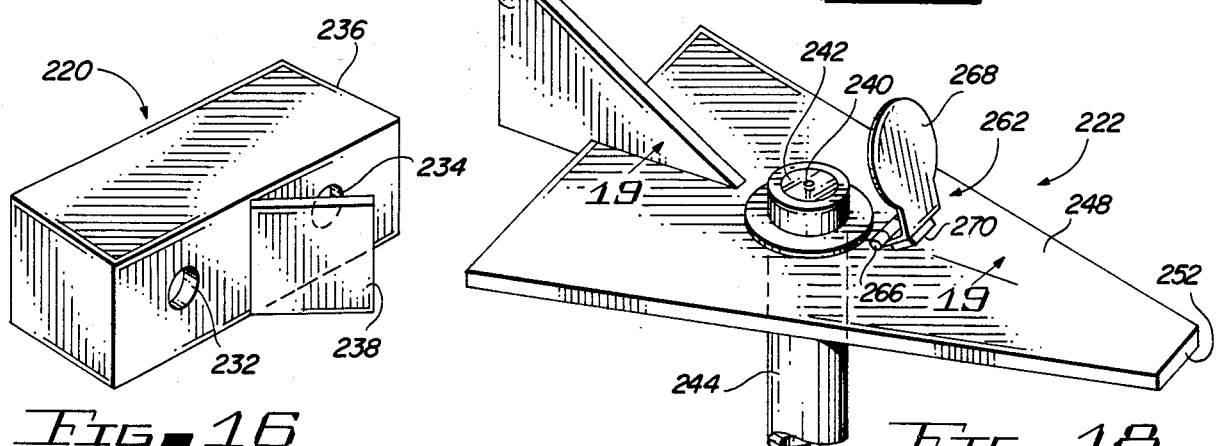
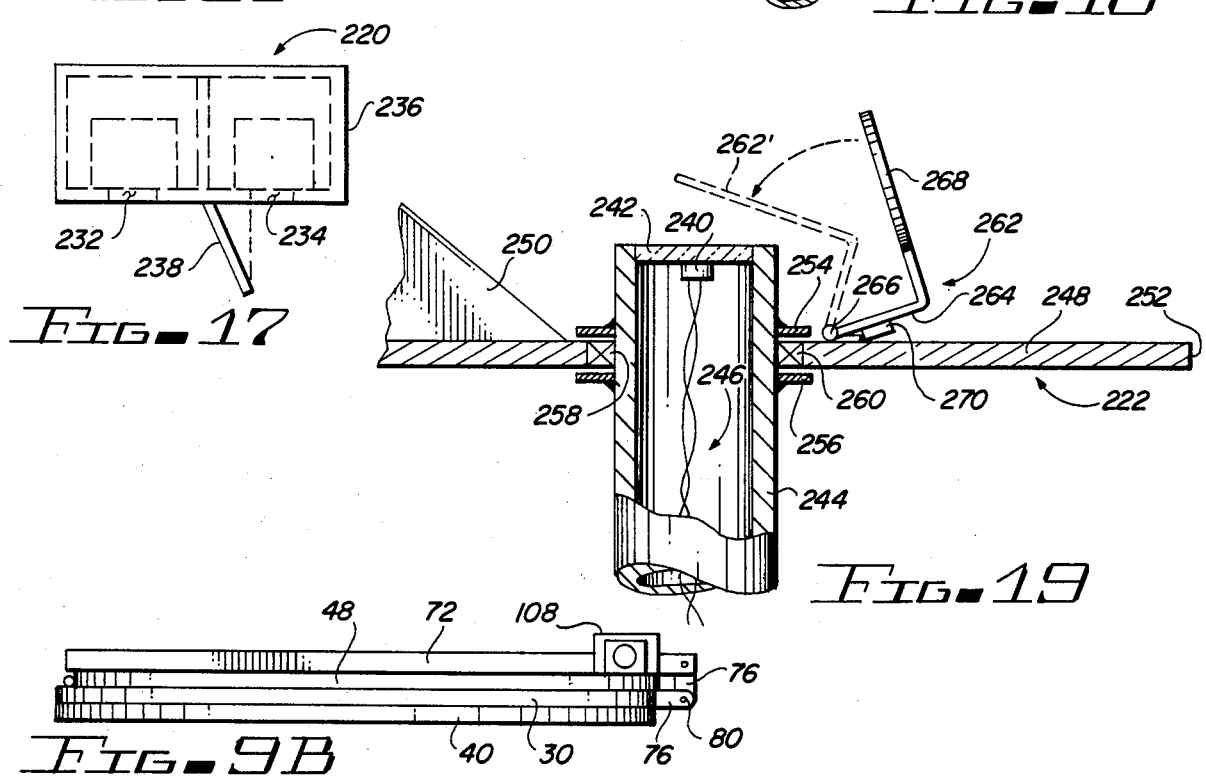

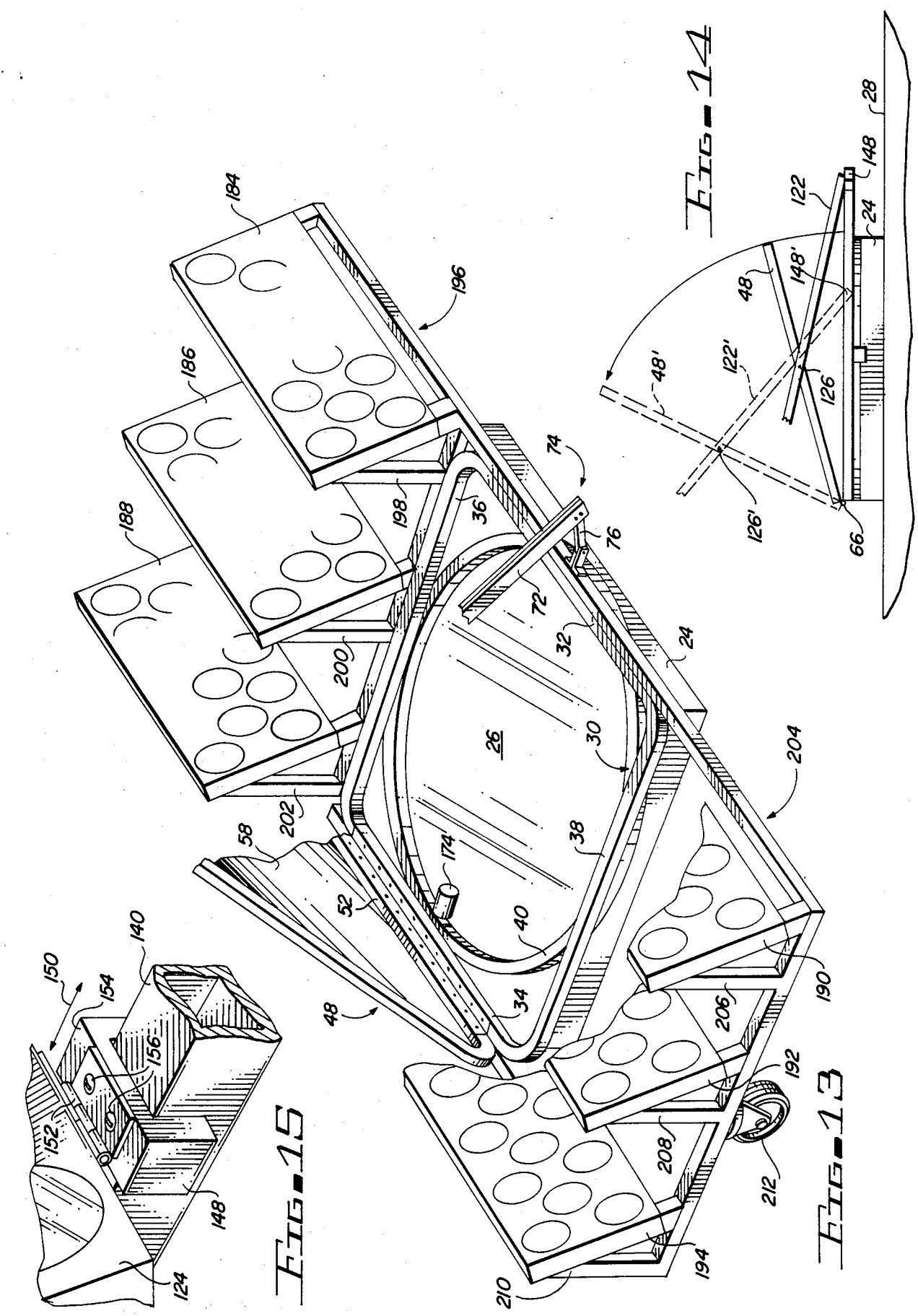

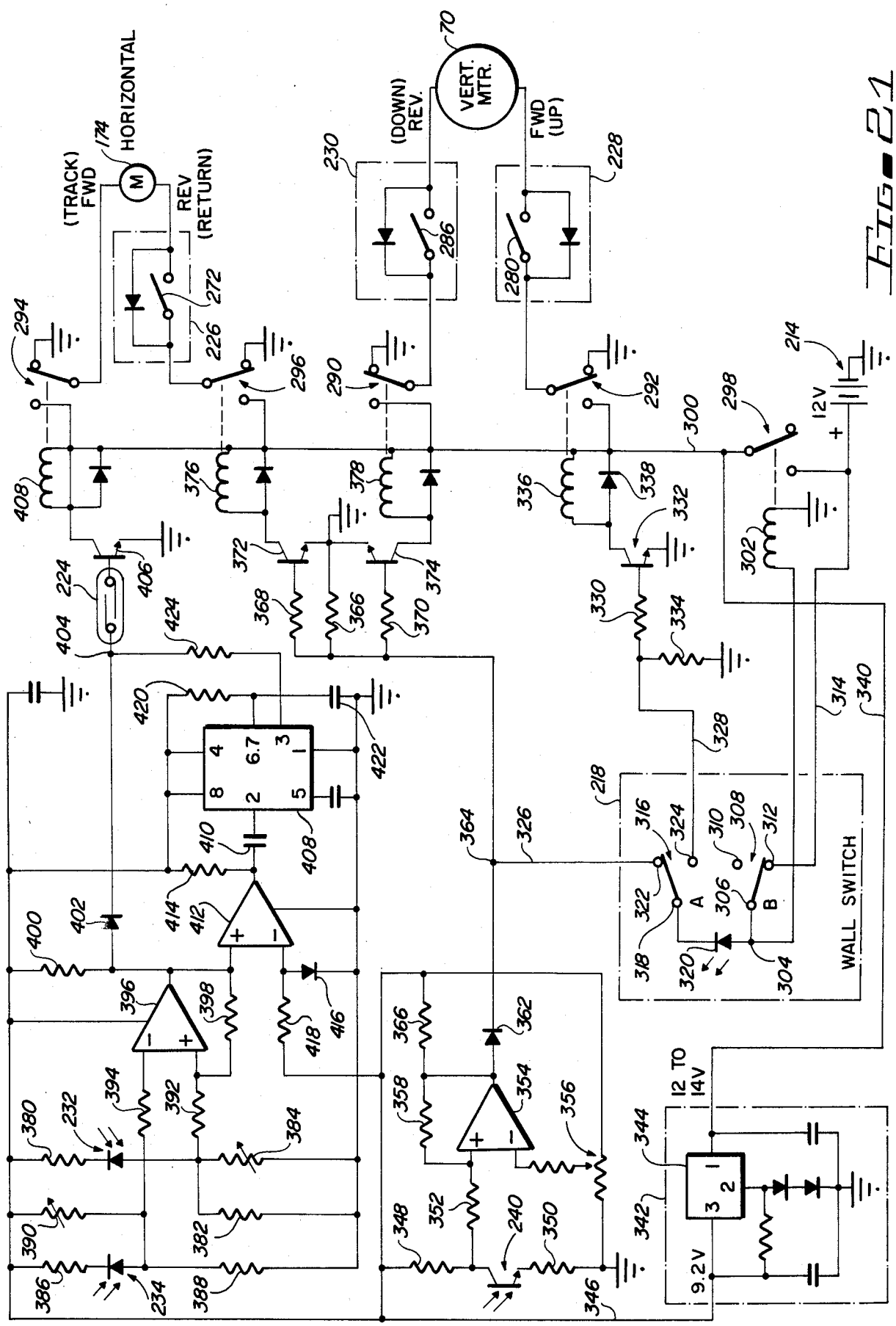

COMBINED SOLAR TRACKING REFLECTOR AND PHOTOVOLTAIC PANEL

TECHNICAL FIELD

The present invention relates generally to a solar lighting reflector apparatus for illuminating the interior of a building, and more particularly, to a solar lighting reflector apparatus including at least one photovolataic panel mechanically coupled to the solar lighting reflector apparatus for tracking movements of the sun therewith.

BACKGROUND ART

U.S. Pat. No. 4,429,952, issued Feb. 7, 1984, describes a tracking reflector assembly for a skylight invented by the present inventor. The tracking reflector assembly disclosed therein is described in conjunction with a skylight, the reflector assembly automatically tracking daily and seasonal movements of the sun for increasing the amount of sunlight directed through the skylight. The tracking reflector assembly includes a ring-shaped base member rotatably supported above the skylight, as well as a reflector pivotally coupled to the ring-shaped base member. A horizontal drive motor engages the ring-shaped base member to horizontally rotate the reflector; a vertical drive motor secured to the rear face of the reflector operates in conjunction with a pair of rack arms for raising and lowering the reflector. Control circuitry, including various photosensors, is provided for selectively operating the horizontal and vertical drive motors. In addition, an apparatus is described for sensing the presence of dangerously high wind conditions to simulate the onset of darkness for closing the reflector to a lowered position.

U.S. Pat. No. 4,114,186, entitled "Lighting Fixture," and issued to the present applicant, discloses a solar lighting fixture, which, in one embodiment thereof includes a telescoping cylindrical light duct including a rotatable top portion having a pivotally connected reflective lid. Drive motors are also provided for rotating the top portion to follow movements of the sun, as well as to open and close the reflective lid.

Other U.S. patents which generally relate to apparatus for illuminating the interior of a building with solar light and/or reflecting solar light upon a solar energy collector include U.S. Pat. Nos. 668,404 (Hanneborg); 1,254,520 (Macduff); 3,709,583 (Pfannkuch et al.); 4,126,379 (Wu); 4,266,530 (Steadman); and 4,297,000 (Fries).

It is also known in the art to use solar energy for the purpose of generating electrical power, and various solar tracking mechanisms have been proposed for continuously positioning photocells to face the sun. For example, U.S. Pat. No. 4,225,781 (Hammons) discloses a solar tracking mechanism which is described for use in conjunction with various types of solar collectors, including a photovoltaic array. Also, in U.S. Pat. No. 4,295,621 (Siryj), a solar tracking mechanism is described for the purpose of orienting a device, such as a plurality of solar cells, to face the sun despite daily and seasonal movements thereof.

While tracking reflector assemblies for use in conjunction with skylights, of the type described in above-mentioned U.S. Pat. No. 4,429,952, provide significant energy cost savings and improved daytime illumination of building interiors, energy savings are somewhat offset by the electrical power required to operate the horizontal and vertical drive motors thereof and the control circuitry related thereto. Moreover, installations of such tracking reflector assemblies upon the rooftops of building is sometimes hampered by the absence of an electrical power box upon the roofs of such buildings. In some cases, the building to be illuminated may be remote from conventional utility power lines.

Other problems may arise in attempting to power tracking reflector assemblies from utility power lines. Temporary electrical power outages result in such tracking reflector assemblies being unable to track movement of the sun, or being unable to open if closed prior to the power outage. Furthermore, power surges imposed upon utility power lines when electrical power is again turned on following such a power outage may damage the electrical components forming the circuitry used to control such tracking reflector assemblies. In addition, buildings having faulty grounding or other electrical wiring problems may allow voltage spikes to be coupled to the control circuitry for such tracking reflector assemblies, which voltage spikes may damage the components forming such control circuitry.

Photovoltaic panels are commercially available which are capable of generating the electrical power required to operate one or more tracking reflector assemblies of the type described above. However, such photovoltaic panels operate most efficiently only when they are generally facing the direction of the sun. While it is known in the art to provide a tracking apparatus for maintaining such photovoltaic panel directed at the sun, as evidenced by the above-referenced patents issued to Hammons and Siryj, the provision of such a complicated tracking mechanism in conjunction with such a photovoltaic panel would typically far outweigh the expense and inconvenience of simply extending the electrical power system of the building up to the rooftop thereof.

As mentioned above in regard to U.S. Pat. No. 4,429,952, it is known to provide an apparatus for sensing dangerously high wind conditions and to shade a photosensor in order to simulate darkness in response to such wind conditions. However, the wind detection apparatus disclosed within the '952 patent is of a type which, once activated by high winds, continuously shades a darkness photosensor until being manually reset by the user. Furthermore, the disclosed wind detection apparatus responds only to winds directed into the tracking reflector apparatus; while high winds emanating from other directions do not pose a threat to the structural integrity of the reflector assembly, such winds typically cause the reflector to vibrate which, in turn, has a distracting effect upon occupants of the building.

Accordingly, it is an object of the present invention to provide a tracking reflector assembly for use in conjunction with conventional skylights and which simultaneously generates sufficient electrical power to operate one or more of such tracking reflector assemblies and to generate electricity which may be used to power other electrical appliances within the building to be illuminated.

It is another object of the present invention to provide an apparatus which uniquely combines the advantages of a tracking skylight reflector assembly and a tracking photovoltaic panel into a single compact, efficient and economical structure.

It is a further object of the present invention to provide a tracking reflector assembly for a skylight and incorporating an improved wind detection apparatus responsive to high winds emanating from any direction while eliminating the need to manually reset such wind detection apparatus after high winds have subsided.

These and other objects of the present invention will become more apparent to those skilled in the art as the description thereof proceeds.

BRIEF SUMMARY OF THE INVENTION

Briefly described, and in accordance with one embodiment thereof, the present invention relates to a solar lighting reflector apparatus for illuminating the interior of a roofed building during daylight hours and adapted to track daily movements of the sun, the apparatus further including at least one photovoltaic panel secured thereto for tracking movements of the sun along with the reflector apparatus. The reflector apparatus includes a lower frame member rotatably supported above a light transmissive opening within the roof of the building to be illuminated. An upper frame member is pivotally coupled to the rear portion of the lower frame member and supports a reflective surface for reflecting solar light through the light transmissive opening. Horizontal and vertical electric drive motors are provided for rotating the lower frame member to track east-to-west movements of the sun and for pivoting the reflective surface between open and closed positions. Control circuitry responsive to the position of the sun is also provided for controlling the horizontal and vertical drive motors.

At least one photovoltaic panel is coupled to the lower frame member for rotation therewith, thereby allowing the photovoltaic panel to track daily movements of the sun along with the reflective surface. The photovoltaic panel is electrically coupled to a storage battery or other device for deriving electrical power therefrom. In turn, the storage battery may be used to supply electrical power to the horizontal and vertical drive motors, to the electrical circuitry used to control the same, and/or to electrical appliances within the building.

In one embodiment of the present invention, one or more photovoltaic panels are each supported in a manner which allows such photovoltaic panels to be lowered to a horizontal position proximate to the roof when the reflective surface of the reflector apparatus is lowered to its closed position, whereas each photovoltaic panel is disposed at an upwardly inclined angle to face the sun when the reflective surface is raised to its opened position. A track is secured to the lower frame member extending parallel to and spaced apart from one of the side portions of the lower frame member, and the lower end of the photovoltaic panel is slidingly coupled to the track. A pivotal connection is formed between a side portion of the upper frame member and the photovoltaic panel at a point remote from the lower end thereof.

In a second embodiment of the present invention, the reflector apparatus includes two or more photovoltaic panels positioned adjacent to a side portion of the lower frame member, the photovoltaic panels being preferably arranged one behind the other. The photovoltaic panels are supported by a bracket secured to the lower frame member for rotation therewith and supporting each of the photovoltaic panels at an upwardly and rearwardly inclined angle to face the sun. A second array of such photovoltaic panels may be positioned along the opposite side portion of the lower frame member and secured thereto. One or more support wheels may be provided in conjunction with the brackets used to support such photovoltaic panels, the support wheels being adapted to rest upon and roll across the roof of the building for rotatably supporting such photovoltaic panels.

In accordance with another embodiment of the present invention, the reflector apparatus includes a darkness photosensor for closing down the reflector apparatus upon the occurrence of darkness; the photosensor is secured to the lower face of a light transmissive lens which closes the upper end of a vertical tubular member. A wind vane is rotatably mounted to the tubular member adjacent the upper end thereof, the wind vane positioning itself to face the direction from which the wind is blowing. A flap is pivotally coupled to the wind vane, the flap including an upper portion which can shade the darkness photosensor from ambient light whenever the flap is pivoted to a position overlying the light transmissive lens by high winds. A weight secured to the lower portion of the flap biases the flap away from the darkness sensor under safe wind conditions.

BRIEF DESCRIPTION OF THE DRAWINGS

FIG. 1 is a perspective view of a solar lighting reflector apparatus incorporating a pair of sliding photovoltaic panels for tracking daily movements of the sun along with the reflector apparatus.

FIG. 2 is a side view of the apparatus shown in FIG. 1 during daylight hours.

FIG. 3 is a side view of a modification of the embodiment of the invention shown in FIG. 2 wherein the photovoltaic panels secured to the reflector apparatus are of lesser height.

FIG. 4 is a top view of a lower frame member and associated ring for supporting the upper frame member of the reflector apparatus.

FIG. 5 is a cross-sectional view taken through lines 5—5 shown in FIG. 1 and illustrating the attachment of a reflective surface to the upper frame member.

FIG. 6 is a cross-sectional view of a reflector apparatus shown in FIG. 1 taken through lines 6—6 and illustrating the rollers used to support the lower frame member, as well as the coupling of the horizontal drive motor gear to the lower frame member support ring.

FIG. 7 is a cross-sectional view of the reflector apparatus shown in FIG. 1 taken through lines 7—7 and illustrating a hinged connection between the upper and lower frame members.

FIG. 8 is a perspective view of the brackets used to adjustably support the rollers which in turn support the horizontal drive gear ring.

FIG. 9A is a side view of the reflector apparatus shown in FIG. 1 and illustrates the manner in which the vertical drive motor cooperates with a vertical drive arm for raising and lowering the upper frame member.

FIG. 9B is a side view of the reflector apparatus shown in FIG. 9A in its fully closed position.

FIG. 10 is an enlarged view of the portion of the vertical drive arm designated by dashed circle 10 within FIG. 9A.

FIG. 11 is a cross-sectional view of the vertical drive apparatus shown in FIG. 9A taken through lines 11—11 and illustrating the coupling of the vertical drive motor to the vertical drive arm.

FIG. 12 is a sectional view of the apparatus shown in FIG. 9A taken thru lines 12—12 and illustrating the manner in which a reed switch attached to the upper frame member cooperates with a magnet secured to the upper end of the vertical drive arm for limiting the extent to which the upper frame member may be pivoted upwardly.

FIG. 13 is a perspective view of a second embodiment of the present invention wherein a series of photovoltaic panels are positioned on either side of the reflector apparatus and are supported by brackets secured thereto for rotation along with the reflector apparatus.

FIG. 14 is a sectional view of the apparatus shown in FIG. 9A taken thru lines 12—12 and illustrating the manner in which a reed switch attached to the upper frame member cooperates with a magnet secured to the upper end of the vertical drive arm for limiting the extent to which the upper frame member may be pivoted upwardly.

FIG. 15 is an enlarged view of the lower portion of a photovoltaic panel shown in FIG. 1 within the dashed circle designated 15 and illustrating a sleeve for slidingly securing the lower edge of the photovoltaic panel to a track secured to the lower frame member of the relfector apparatus.

FIG. 16 is a perspective view of a dual photosensor mechanism used to detect east-to-west movements of the sun for controlling the horizontal drive motor.

FIG. 17 is a top view of the photosensor mechanism shown in FIG. 16.

FIG. 18 is a perspective view of a control mechanism used to simultaneously sense the onset of darkness at the end of each day and the occurrence of dangerously high winds which require the temporary closing of the reflector apparatus.

FIG. 19 is a cross-sectional view of the control mechanism shown in FIG. 18.

FIG. 20 is a simplified block diagram illustrating the manner in which various sensors and switches are used to control the horizontal and vertical drive motors.

FIG. 21 is a detailed electrical schematic illustrating the control circuitry used to operate the reflector apparatus.

DETAILED DESCRIPTION OF THE PREFERRED EMBODIMENTS

A first embodiment of the solar lighting reflector apparatus of the present invention is shown in FIG. 1 and is designated generally by reference numeral 22. As shown in FIG. 1, solar lighting reflector apparatus 22 is supported over a conventional roof-mounted skylight including a square-shaped frame 24 and a light transmissive opening within roof 28, as is conventional in the art.

Solar lighting reflector apparatus 22 includes a lower frame member 30 which, as shown in FIGS. 1 and 4, has a generally rectangular shape and is preferably square. Lower frame member 30 may be formed of one-inch square aluminum tubing bent into the shape of a rectangle and closed upon itself. Lower frame member 30 includes a front portion 32, an opposing rear portion 34, a first side portion 36, and an opposing second side portion 38. Thus, lower frame member 30 provides a square-shaped central opening generally commensurate in size with the skylight lens 26.

With reference to FIGS. 1, 4, and 7, lower frame member 30 is disposed above and secured to a support ring 40 which maintains lower frame member 30 in a generally horizontal position and permits it to rotate in a substantially horizontal plane in a manner described below. As shown in FIGS. 1 and 4, lower frame member 30 contacts support ring 40 at approximately the mid-section of each of lower frame member portions 32, 34, 36, and 38. Referring to FIG. 7, support ring 40 has a U-shaped cross-section for providing an outwardly directed channel. Support ring 40 may be formed of extruded aluminum channel stock one inch in width bent into a ring closed upon itself. As shown in FIG. 7, a toothed drive ring 42 is secured, as by rivets 44, to the inner wall of support ring 40. The lower edge of drive ring 42 includes a circular toothed gear rack 46 to facilate the rotation of support ring 40 and attached lower frame member 30.

Referring to FIG. 1, reflector apparatus 22 also includes an upper frame member designated generally by reference numeral 48. Upper frame member 48 includes a front portion 50, an opposing rear portion 52, a first side portion 54, and an opposing second side portion 56. Like lower frame member 30, upper frame member 48 has a generally rectangular shape and is preferably square and of the same size as lower frame member 30. Upper frame member 48 may also be formed of one-inch square aluminum tubing bent into a rectangular shape and closed upon itself.

Upper frame member 48 serves to support a reflective surface 58 for reflecting solar energy through skylight lens 26. As shown in FIG. 5, reflective surface 58 may take the form of a reflective film 58, of the type commercially available from 3M Corporation under the trademark "Scotchcal" secured to a reinforcing backing panel 60 made of twin-walled polycarbonate sheet material to the type commercially available from Rohm & Haas Corporation. Still referring to FIG. 5, panel 60 is secured about its periphery to upper frame member 48 as by rivets 62. As shown in FIG. 5, a thin layer of a silicon sealer 64 may be inserted between upper frame member 48 and the portion of reflector film 58 along the periphery thereof to insure a secure connection therebetween.

With reference to FIGS. 1 and 7, upper frame member 48 is pivotally coupled to lower frame member 30 for allowing reflective surface 58 to be selectively positioned in an upwardly extending open position, as shown in FIG. 1, for reflecting solar light into the interior of the building or in a substantially horizontal closed position overlying and shading skylight lens 26. A piano hinge 66 is secured to the rear portions 34 and 52 of lower frame member 30 and upper frame member 48, respectively, as by screws 67 and 68.

Upper frame member 48 and reflective surface 58 supported thereby are pivoted between the aforementioned opened and closed positions by a vertical drive electric motor 70 acting in cooperation with a vertical drive arm 72. As shown in FIGS. 7 and 9A, the lower end 74 of vertical drive arm 72 includes a short extension member 76 extending generally perpendicular to vertical drive arm 72 and rigidly secured thereto. Extension member 76 is pivotally coupled to a knuckle 78 extending forwardly from front portion 32 of lower frame member 30, as by a hinge pin 80 (see FIG. 9A). Referring briefly to FIG. 9B, the purpose of extension member 76 is to offset vertical drive arm 72 upwardly from lower frame member 30 and upper frame member 48 when the reflector apparatus is in its closed position, allowing vertical drive arm 72 to lie horizontally across upper frame member 48.

As shown in FIGS. 10 and 11, vertical drive arm 72 includes an H-shaped extruded aluminum bar 82. A toothed gear rack 84 having a plurality of gear teeth 86 is secured within one of the channels of H-shaped bar 82, as by screws 88. Toothed gear rack 84 may be formed from an aluminum bar into which gear teeth 86 are machined.

With reference to FIGS. 11 and 12, vertical drive motor 70 is supported by an associated gear box 90 from which an output shaft 92 extends. Gear box 90 includes reduction gears for reducing the rotational speed of vertical drive motor 70. Gear box 90 is in turn mounted to a support bracket 94 secured to front portion 50 of upper frame member 48, as by screws 96 and 98. The portion of support bracket 94 remote from gear box 90 includes an upwardly turned flange 100 including a bearing 102 for rotatably supporting the end of drive shaft 92 remote from gear box 90. Circular drive gear 104 is secured to drive shaft 92, as by Allen head screw 106 for engaging toothed gear rack 84 of vertical drive arm 72. As vertical drive motor 70 is rotated in a first direction, upper frame member 48 pivots upwardly; when vertical drive motor 70 is rotated in the opposite direction, circular drive gear 104 traverses vertical drive arm 72 in the opposite direction for lowering upper frame member 48.

In order to maintain toothed gear rack 84 of vertical drive arm 72 meshed with circular drive gear 104, a U-shaped collar 108 is provided, as shown most clearly in FIGS. 11 and 12. The downwardly turned arms 110 and 112 of collar 108 are provided with bearings 114 and 116, respectively, for rotatably engaging drive shaft 92. A stop 118 is secured to drive shaft 92 for preventing lateral movement of collar 108 relative to drive shaft 92. Tab 120 extends from the central portion of collar 108 between and parallel to arms 110 and 112 thereof and is slidably engaged within the second of the channels of H-shaped member 82 of vertical drive arm 72. In this manner, collar 108 continuously urges vertical drive arm 72 against circular drive gear 104.

It will be recalled that one of the objects of the present invention is to provide a tracking reflector assembly which generates electrical power that may be used to operate one or more of such tracking reflector assemblies. To this end, a pair of photovoltaic panels 122 and 124 are provided as shown in FIG. 1. Such photovoltaic panels are available from a variety of sources, including Photowatt Manufacturing Company of Tempe, Ariz. Such photovoltaic panels typically measure one foot in width and either two or four feet in length. Referring briefly to FIGS. 2 and 3, photovoltaic panel 124 within FIG. 2 is a 4 foot long photovoltaic panel, while photovoltaic panel 124 within FIG. 3 is a 2 foot long photovoltaic panel. The 4 foot long photovoltaic panels 122 and 124 shown in FIGS. 1 and 2 typically provide a 12 volt direct current output and are typically rated at either 35 watts or 50 watts each.

The manner in which photovoltaic panels 122 and 124 are mounted to reflector apparatus 22 for rotation therewith will now be described. As shown in FIG. 1, an axle 126 extends perpendicularly from side portion 56 of upper frame member 48. A pair of brackets, including bracket 128, are secured to the rear face of photovoltaic panel 122 adjacent each side edge thereof for rotatably engaging axle 126 and thereby providing a pivotal connection between photovoltaic panel 122 and upper frame member 48. As shown in FIG. 1, bracket 128 engages axle 26 at a point somewhat remote from the lower end 130 of panel 122. As further shown in FIG. 1, a support brace 132 may extend from side portion 56 of upper frame member 48 behind axle 126 to aid in supporting the end of axle 126 remote from upper frame member 48. A similar support brace 134 is provided for supporting a similar axle (not shown) pivotally connected to panel 124. Braces 132 and 134 may simply form a continuation of axle 126, as shown in FIG. 1, or may be rotatably coupled to axle 126.

Lower end 130 of photovoltaic panel 122 is slidingly supported by a track 136 secured to lower frame member 30. Similarly, the lower end 138 of photovoltaic panel 124 is slidingly secured to a track 140 that is also secured to lower frame member 30. Track 136 extends generally parallel to and spaced apart from side portion 38 of lower frame member 30. Track 136 may be formed of tubular aluminum having a square cross-section, the ends of which may be bent to form front and rear sections 142 and 144, respectively. Section 142 of track 136 extends parallel to front portion 32 of lower frame member 30 and may be secured thereto as by rivets 146. Rear portion 144 of track 136 is secured to rear portion 34 of lower frame member 30 in a similar manner. Lower ends 130 and 138 of panels 122 and 124 are each slidingly secured to their respective track by a hinged sleeve, the details of which are shown in FIG. 15. Sleeve 148 surrounds track 140 for sliding movement therealong, as designated by arrows 150 within FIG. 15. A hinge 152 is secured to the upper face 154 of sleeve 148, as by screws 156. Hinge 152 is also secured to the lower edge of photovoltaic panel 124 to provide a hinged joint between panel 124 and sleeve 148. Preferably, sleeve 148 is formed of a plastic material to facilitate sliding over aluminum track 140.

As shown in FIGS. 1 and 2, upper frame member 48, and reflective surface 58 supported thereby, are raised to approximately a 65° angle to the horizontal during normal daylight hours for reflecting solar light through skylight lens 26. When upper frame member 48 is raised to the 65° opened position, photovoltaic panels 122 and 124 are positioned at an upwardly and rearwardly inclined angle, relative to their lower ends, of approximately 40° to the horizontal for being generally directed toward the sun. As explained above, upper frame member 48 is pivoted to a closed position overlying lower frame member 30 at the onset of darkness. As upper frame member 48 pivots to its closed position, lower ends 130 and 138 of photovoltaic panels 133 and 124 slide forwardly for allowing panels 122 and 124 to be folded to an essentially horizontal lowered position. Referring briefly to FIG. 14, dashed lines 48' and 122' depict the positions of upper frame member 48 and photovoltaic panel 122 in the opened position during daylight hours. Solid lines 48 and panel 122 depict the positions of upper frame member 48 and panels 122, respectively, as they are lowered toward the closed position. Reference number 148 and 148' illustrate the manner is which sleeve 148 slides over its associated track, while reference numbers 126 and 126' illustrate the movement of axle 126 during the opening and closing precedures.

The reflector apparatus described in regard to FIG. 1 has many advantages, including the combination of photovoltaic panels and a solar light reflector in an integrated, highly compact structure which may be easily shipped to and installed at the job site. Moreover, supporting the photovoltaic panels from the upper and lower frame member of reflector apparatus 22 insures that such panels track daily east-to-west movements of the sun along with reflector apparatus 22. The drive mechanism for rotating lower frame member 30 in a horizontal plane to follow such movement of the sun is described immediately below:

As mentioned above in regard to FIG. 7, lower frame member 30 is secured atop a support ring 40 to which a toothed drive ring 42 is secured. Referring to FIG. 6, a plurality of rollers, such as roller 158, extend within the U-shaped circular channel of support ring 40 for rotatably supporting ring 40, and lower frame member 30 secured thereto, above skylight lens 26. As shown in FIG. 6, roller 158 is rotatably supported upon an axle 160 which extends through a slotted aperture 162 within the upper end of roller support bracket 164 (see FIG. 8). A fastener, such as nut 166, threadedly engages the end of axle 160 for securing it to support bracket 164. As shown in FIG. 8, support bracket 164 includes a pair of slotted apertures 168 and 170 adapted to receive screws, such as screw 172 in FIG. 6, for attaching roller support bracket 164 to the side of skylight frame 24. A support roller and an associated roller support bracket are secured to skylight frame 24 proximate the mid portion of each of its sides for rotatably engaging support ring 40.

In order to rotate support ring 40 to track daily movements of the sun, a horizontal drive motor 174 is provided. Motor 174 is secured to a right-angle mounting bracket 176 which is in turn secured to skylight frame 24. A drive shaft 178 extends from motor 174 along a horizontal axis and extends through an aperture 180 in mounting bracket 176. Circular drive gear 182 is fastened over the end of drive shaft 178 and is rotated by motor 174 upon actuation thereof. Drive gear 182 engages the circular toothed drive ring 42 for rotating support ring 40 in a horizontal plane whenever motor 174 is operated.

FIG. 13 shows a second embodiment of the present invention wherein structural features indentical to those described above in regard to FIG. 1 have been designated with identical reference numerals. The embodiment of the present invention shown in FIG. 13 differs from the embodiment shown in FIG. 1 by providing a greater number of photovoltaic panels, each of which is permanently installed at an upwardly and rearwardly inclined angle. As shown in FIG. 13, a first array of three photovoltaic panels 184, 186, and 188 are disposed one behind the other adjacent side portion 36 of lower frame member 30. Similarly, a second array of photovoltaic panels 190, 192, and 194 are disposed on the opposite side of lower frame member 30 adjacent side portion 38 thereof. Each of photovoltaic panels, 184–194 shown in FIG. 13 is oriented with its longitudinal axis being horizontal in order to prevent the forwardmost photovoltaic panels from shading the photovoltaic panels positioned therebehind. Each such photovoltaic panel is oriented at approximately a 45° angle to the horizontal for facing the sun. Photovoltaic panels 184–194 may be of the same general type as photovoltaic panels 122 and 124 described above in regard to FIG. 1.

The first array of photovoltaic panels 184–188 is supported by a frame generally designated by reference numeral 196. Frame 196 includes mounting brackets 198, 200, and 202 for supporting photovoltaic panels 184, 186, and 188, respectively, in an upwardly and rearwardly inclined angle. Frame 196 is secured to side portion 36 of lower frame member 30 for rotation therewith. Similarly, a second frame 204 includes brackets 206, 208, and 210 for supporting photovoltaic panels 190, 192, and 194, respectively. Frame 204 is secured to side portion 38 of lower frame member 30 for rotation therewith. Each of frames 196 and 204 may include a support wheel 212 rotatably secured to the lowermost portion thereof and adapted to rest upon and roll across the roof of the building upon which the reflector apparatus is installed for helping to support the weight of photovoltaic panels 184–194 and their associated frames, 196 and 204, without inferfering with the rotation of lower member 30 for tracking daily movements of the sun.

The embodiment of the present invention shown within FIG. 13 is capable of generating up to 330 watts of power, assuming each of the six photovoltaic panels is rated at 55 watts. The described structure is capable of tracking daily movements of the sun while maintaining a relatively low profile to avoid detracting from the aesthetics of the building upon which the apparatus is mounted.

The block diagram of FIG. 20 illustrates, in simiplified form, the various electrical components used to operate the reflector apparatus described in FIGS. 1 and 13. Vertical and horizontal drive motors 70 and 174 have been described above and are designated by like reference numerals within FIG. 20. Similarly, box 122 within FIG. 20 designates one or more photovoltaic panels of the type generally shown in FIG. 1. The electrical power generated by photovoltaic panels 122 is electrically coupled to a direct current storage battery 214, which in FIG. 20 is indicated as a 12 volt battery. Vertical drive motor 70 and horizontal drive motor 174 may also be 12 volt DC motors for being powered by storage battery 214. However, those skilled in the art will appreciate that vertical drive motor 70 and horizontal drive motor 174 may also be 24 volt DC motors, and that storage battery 214 may be a 24 volt battery. In this event, photovoltaic panels 122, even if rated at 12 volts DC each, may be coupled in series to provide an output voltage of 24 volts to storage battery 214. Where multiple photovoltaic panels are provided, such as in the embodiment of the invention shown in FIG. 13, the panels may be coupled in series and/or parallel with one another to provide a net output voltage corresponding to that of storage battery 214.

Also shown in FIG. 20 is control circuitry box 216 which receives electrical power stored by battery 214 and selectively provides electrical power to drive motors 70 and 174 in response to signals received by various switches and sensors. Control circuitry 216 is coupled to a manually operated wall switch 218 for allowing a user to selectively open or close the reflector apparatus during the daylight hours. For example, a user may wish to defer the opening of the reflector apparatus until several hours after sunrise, or to close the reflector apparatus several hours prior to sunset, if the building to be illuminated is not normally occupied during such hours. Control circuitry 216 is also responsive to a pair of photosensors 220 for tracking east-to-west movement of the sun and for selectively powering horizontal drive motor 174 in response thereto. Control circuitry 216 is also responsive to a darkness/wind sensor 222 for recognizing both sunrise and sunset and automatically opening and closing the reflector apparatus in response thereto, respectively.

As explained in greater detail below, tracking photosensors 220 may provide a false indication of the position of the sun if the reflector apparauts is not raised to its fully opened position. Accordingly, a mercury switch 224 is coupled to control circuitry 216 and is mounted to upper frame member 48 for disabling actuation of horizontal drive motor 174 until the reflector apparatus is fully opened.

At the end of each day, the reflector apparatus is lowered to its closed position and returned to an eastwardly facing position in preparation for opening on the following day. The process of closing the reflector apparatus and returning it to face the east may be initiated either automatically be darkness sensor 222 or manually via wall switch 218. In either case, control circuitry 216 reverses the direction of horizontal drive motor 174 for rotating the reflector apparatus from the west back to the east. As shown in FIG. 20, full east limit switch 226 is interposed between control circuitry 216 and horizontal drive motor 174 for terminating the operation of horizontal drive motor 174 in the reverse direction when the reflector apparatus has been returned to its full east position.

The opening of the reflector apparatus may be initiated either automatically at sunrise via darkness sensor 222 or manually via wall switch 218. In either case, control circuitry 216 applies electrical power to vertical drive motor 70 for pivoting upper frame member 48 toward its opened position. A vertical-up limit switch 228 is interposed between control circuitry 216 and vertical drive motor 70 for terminating the the application of electrical power to vertical drive motor 70 in the forward direction when upper frame member 48 has reached its fully opened position (approximately 60° to the horizontal).

As described above, closure of the reflector apparatus may be initiated either automatically by darkness/wind sensor 222 or manually by wall switch 218. In either event, control circuitry 216 applies electrical power to vertical drive motor 70 in a reverse direction for lowering upper frame member 48 toward its closed position. A vertical down limit switch 230 is interposed between control circuitry 216 and vertical drive motor 70 for terminating the application of electrical power through vertical drive motor 70 in the reverse direction upon upper frame member 48 reaching its fully closed position.

As mentioned above, in regard to FIG. 20, a pair of photosensors 220 are provided for tracking east-to-west movement of the sun. Referring briefly to FIGS. 16 and 17, tracking photosensors 220 include a first photosensor 232 and a second photosensor 234 contained within housing 236. A shade panel 238 extends forwardly from housing 236 from a point midway between photosensors 232 and 234 at an angle directed away from photosensor 232. Housing 236 is mounted atop front portion 50 of upper frame member 48, as shown in FIG. 1. So long as reflector apparatus 22 is generally directed toward the sun, photosensors 232 and 234 tend to receive relatively the same amount of light, representing a balanced condition. As the sun continues to move to the west, panel 238 tends to shade photosensor 234 from the rays of the sun, resulting in an unbalanced condition wherein photosensor 232 receives more sunlight than photosensor 234. Control circuitry 216 responds to the presence of the unbalanced condition by actuating horizontal drive motor 174 in the forward direction until photosensors 232 and 234 again receive relatively the same amount of sunlight. Upon reestablishing this balanced condition, control circuitry 216 terminates the the application of electrical power to horizontal drive motor 174. In this manner, horizontal drive motor 174 is periodically actuated to maintain front portion 50 of upper frame member 48 and front portion 32 of lower frame member 30 generally directed toward the sun.

As mentioned above with regard to FIG. 20, the reflector apparatus preferably includes a darkness/wind sensor 222, the purpose of which is to automatically initiate the opening of the reflector apparatus at sunrise and to automatically close the reflector apparatus upon sensing sunset or the occurrence of dangerously high winds. FIGS. 18 and 19 illustrate the structural details of darkness/wind sensor 222. As shown therein, a photosensor 240 is secured to the lower face of a light transmissive lens 242 which sealingly closes the upper end of a vertically oriented pole or tube 244. Photosensor 240 is coupled to control circuitry 216 (see FIG. 20) via wires 246 for signaling the presence or absence of sunlight. Pole 244 may be mounted upon the roof of the building to be illuminated at a point near reflector apparatus 22.

In order to allow photosensor 240 to indicate the presence of dangerously high winds, a wind vane 248 is rotatably secured about the upper end of tube 244 for rotation about a vertical axis. As shown in FIGS. 18 and 19, wind vane 248 includes a tail rudder 250 for causing the front end 252 of wind vane 248 to be directed into the wind. Upper and lower horizontal rims 254 and 256, respectively, are secured as by welding to the outer wall of tube 244 and are spaced apart from one another for serving as a guide in which wind vane 248 may rotate. As shown in FIG. 19, wind vane 248 includes a central aperture 258 through which the upper end of tube 244 extends. A bearing 260 may be secured to wind vane 248 commensurate with aperature 258 to faciliate the rotation of wind vane 248 about tube 244.

Still referring to FIGS. 18 and 19, a wind flap 262 is provided for shading photosensor 240 in the presence of high winds and thereby simulating the onset of darkness for closing the reflector apparatus. Wind flap 262 includes a lower portion 264 pivotally coupled to wind vane 248 by hinge 266. Wind flap 262 includes an upper portion 268 having an area commensurate with the area of lens 242. Hinge 266 is secured to wind vane 248 at a point between lens 242 and front end 252. Accordingly, upper portion 268 of wind flap 262 always faces the wind. The forces of the wind tends to rotate wind flap 262 about hinge 266 for causing upper portion 268 to cover lens 242 and shade photosensor 240, thereby simulating darkness.

It has been determined that only winds of approximately 35 miles per hour or stronger require the closure of the reflector apparatus. While the reflector apparatus is capable of resisting winds of such strength without becoming damaged, such winds tend to vibrate the reflective surface supported by upper frame member 48, thereby resulting in distracting movement of the reflected light within the illuminated building. In order to insure that wind flap 268 is not pivoted over photosensor 240 for winds of less than 35 miles per hour, wind flap 262 is normally biased away from photosensor 240. As shown in FIGS. 18 and 19, a simple weight 270 may be secured to lower portion 264 of wind flap 262 for tending to bias wind flap 262 toward the solid line position shown in FIG. 19. Accordingly, only winds in excess of 35 miles per hour, or some other predetermined wind speed, are sufficient to advance wind flap 262 towards its shading position indicated by dashed lines 262'. When such winds subside, wind flap 262 is biased away from photosensor 240 due to weight 270.

It will be recalled from the discussion of FIG. 20 that the reflector apparatus includes a full east limit switch 226 for indicating that horizontal drive motor has rotated the reflector apparatus to its full east position. Such a full east limit switch may take the form of a magnetic reed switch, designated within FIG. 4 by reference numeral 272, fixedly secured to the skylight frame. An associated permanent magnet 274 is secured to side portion 36 of lower frame member 30, as shown in FIG. 4. Assuming that, within FIG. 4, horizontal drive motor 174 is mounted to the northernmost side of the skylight frame 24, then the full east position of the reflector apparatus corresponds to lower frame member 30 having been rotated counterclockwise by 90° from its position shown in FIG. 4, at which time permanent magnet 272 is normally closed but is opened when permanent magnet 274 is proximate thereto. As will be described in greater detail below, the opening of reed switch 272 terminates actuation of horizontal drive motor 174 in the direction which causes counterclockwise rotation of lower frame member 30 with respect to FIG. 4.

Referring again briefly to FIG. 20, it will be recalled that vertical up limit switch 228 and vertical down limit switch 230 are provided for assisting in the control of vertical drive motor 70. As shown in FIG. 12, a permanent magnet 276 is secured to bracket 278 which extends from the upper end of vertical drive arm 72. Magnetic reed switch 280 is secured to gear box 90 and is normally closed for allowing current to flow throught vertical drive motor 70 in the forward direction for raising the reflector apparatus. When vertical drive motor 70 has raised upper frame member 48 to its fully opened position, magnetic reed switch 280 is brought into proximity with permanent magnet 276, causing reed switch 280 to open for preventing the further application of electrical power to vertical drive motor 70 in a forward direction.

Similarly, a permanent magnet 284 is secured to the front portion 50 of upper frame member 30 for cooperating with an associated magnetic reed switch 286 secured to front portion 50 of upper frame member 48, as shown in FIG. 1. Upon upper frame member 48 overlying lower frame member 30 in the closed position, permanent magnet 248 opens magnetic reed switch 286 to prevent the further application of electrical power to vertical drive motor 70 in a direction which would tend to further lower upper frame member 48. Thus, magnetic reed switch 286 corresponds to vertical down limit switch 230 of FIG. 20.

The circuit details for control circuitry block 216 of FIG. 20 are shown in schematic form within FIG. 21. Shown in the lower portion of FIG. 21 is storage battery 214 which is charged by the photovoltaic panels described above. Storage battery 214 provides a +12 volt DC supply for directly powering vertical drive motor 70 and horizontal drive motor 174. The positive terminal of storage battery 214 is coupled by a relay switch 298 to conductor 300 which is in turn coupled to a first switching terminal for each of relay switches 290, 292, 294, and 296. A second switching terminal for each of relay switches 290 through 296 is coupled to ground potential. Relay switches 290 and 292 selectively direct electrical current from storage battery 214 through vertical drive motor 70 in either a forward direction (up) or a reverse direction (down). Similarly, relay switches 294 and 296 selectively conduct electrical current from storage battery 214 through horizontal drive motor 174 in a forward direction (tracking east-to-west) or a reverse direction (return to full east).

In order to operate horizontal drive motor 174 in the forward direction, relay switch 294 is moved to engage the switch contact coupled to conductor 300, while relay switch 296 is simultaneously allowed to rest against the switch contact coupled to ground potential. A circuit is thereby completed from the positive terminal of storage battery 214, through relay switch 294 and through horizontal drive motor 174 to ground potential through relay switch 296. The above described operation of relay switches 294 and 296 is reversed to operate horizontal drive motor 174 in the reverse direction. In a similar manner, relay switches 290 and 292 may be selectively positioned to direct electrical current in either direction through vertical drive motor 70.

Reed switches 272, 280, and 286 are shown in FIG. 21 corresponding to full east limit switch 226, vertical up limit switch 228, and vertical down limit switch 230, respectively shown in FIG. 20. As shown in FIG. 21, a diode is coupled across each such reed switch to permit current to flow from the associated drive motor to ground even if the reed switch is opened. Thus, for example, current can flow from the Reverse terminal of horizontal drive motor 174 to ground through the diode in parallel with reed switch 272, in order to rotate the reflector apparatus away from its full east position, even though reed switch 272 is opened due to proximity to its corresponding permanent magnet 274.

As noted above, relay switch 298 is interposed between the positive supply terminal of storage battery 214 and conductor 300. The position of relay switch 298 is controlled by an electric coil 302 coupled in series between node 304 and ground potential. Node 304 is coupled to a first switch contact 306 of a first toggle switch 308 of manual wall switch 218. Toggle switch 308 selectively couples switch contact 306 either to an open contact 310 or to switch contact 312; contact 312 is coupled by conductor 314 to the positive supply terminal of storage battery 214.

The user may selectively disable the reflector apparatus by positioning toggle switch 308 to engage open switch contact 310, in which case no current flows through relay coil 302, resulting in relay switch 298 assuming its opened position. To enable the reflector apparatus, toggle switch 308 is positioned to electrically couple switch contact 306 to switch contact 312 allowing current to flow through relay coil 302 for closing relay switch 298, thereby electrically coupling conductor 300 to storage battery 214.

Wall switch 218 includes a second toggle switch 316 which allows the user to selectively lower the reflector apparatus to its closed position pointing due east or to allow the reflector apparatus to raise to its open position. Switch contact 318 of toggle switch 316 is coupled through a light emitting diode 320 to node 304. LED 320 is physically mounted within the switch wall plate for manual switch 218 for indicating to the user that first toggle switch 308 is providing electrical power to the remainder of the electrical control circuitry. Toggle switch 316 selectively couples switch contact 318 either to switch contact 322 or 324. When toggle switch 316 couples switch contacts 318 and 322 together, a positive voltage is applied to conductor 326 for causing the reflector apparatus to be lowered and returned to the full east position, in a manner described in greater detail below. In contrast, when toggle switch 316 couples switch contacts 318 and 324 together, a positive voltage is coupled to conductor 328. Conductor 328 is coupled by a biasing resistor 330 to the base of a switching transistor 332, the emitter of which is coupled to ground. The second biasing resistor 334 is coupled from conductor 328 to ground. The collector of transistor 332 is coupled through relay coil 336 to power supply conductor 300. Diode 338 is coupled in parallel with relay coil 336, the anode of diode 338 being coupled to the collector of transistor 332. Diode 338 is normally reverse-biased and serves to limit voltage spikes across relay coil 336 when the current therethrough is switched off.

When toggle switch 316 shorts switch contact 318 to contact 324, a positive voltage is supplied to the base terminal of transistor 332, biasing it into conduction. Accordingly, the collector terminal of transistor 332 draws current through coil 336, causing it to move relay switch 292 into the position which couples conductor 300 to the forward terminal of vertical drive motor 70, thereby allowing the same to raise the reflector apparatus to its opened position.

As shown in FIG. 21, conductor 300 is further coupled by a conductor 340 to a regulated power supply shown within dashed box 342. Regulated power supply 342 includes a three terminal voltage regulator integrated circuit 344 and associated components for converting the unregulated 12 to 14 volt input supplied by storage battery 214 to a regulated 9.2 volt DC output voltage upon conductor 346.

Still referring to FIG. 21, phototransistor 240 corresponds to the photosensor 240 described above in regard to FIGS. 18 and 19 for detecting the onset of darkness or dangerously high winds. The collector terminal of phototransistor 240 is coupled through resistor 348 to power supply conductor 346. The emitter terminal of phototransistor 240 is coupled by a biasing resistor 350 to ground potential. The collector of phototransistor 240 is further coupled by input resistor 352 to the non-inverting input terminal of an operational amplifier 354 configured as a voltage comparator. The inverting input terminal of amplifier 354 is coupled to the center tap of a potentiometer 356, the ends of which are coupled between power supply conductor 346 and ground potential. Feedback resistor 358 couples the output terminal of amplifier 354 to the non-inverting input terminal thereof. Load resistor 360 is coupled from the output terminal of amplifier 354 to power supply conductor 346.

Assuming that phototransistor 240 detects the presence of adequate sunlight to illuminate the building, transistor 240 is rendered conductive, and the collector terminal thereof assumes a voltage substantially below that of power supply conductor 346. Potentiometer 356 is adjusted to provide a center tap voltage more positive than the voltage at the collector terminal of phototransistor 240 when phototransistor 240 is fully conductive. Accordingly, the output terminal of amplifier 354 assumes a voltage near ground. On the other hand, upon the onset of darkness, phototransistor 240 is rendered essentially non-conductive, in which case the voltage at the collector terminal of phototransistor 240 rises to approximately 9.2 volts, in turn, causing the voltage at the output of amplifier 354 to rise to approximately 9.2 volts.

The output terminal of amplifier 354 is coupled to the anode of diode 362, the cathode of which is coupled to conductor 326 and node 364. The purpose of diode 362 is to isolate the output terminal of amplifier 354 from node 364 whenever the output voltage of amplifier 354 is near ground potential. It will be appreciated that the voltage at node 364 can be raised to a positive DC voltage either by amplifier 354 (indicating the onset of darkness or the existence of dangerously high winds) or by the operation of toggle switch 316.

Node 364 is coupled through a biasing resistor 366 to ground. Node 364 is further coupled through resistors 368 and 370 to the base terminals of switching transistors 372 and 374, respectively. The emitter terminals of transistors 372 and 374 are coupled to ground, while the collector terminals of transistors 372 and 374 are coupled by relay coils 376 and 378, respectively, to conductor 300. When conducting current, relay coil 376 causes relay switch 296 to couple conductor 300 to the reverse terminal of horizontal drive motor 174. Similarly, when conducting current, relay coil 378 causes relay switch 290 to couple conductor 300 to the reverse terminal of vertical drive motor 70. In this manner, horizontal drive motor 174 rotates the reflector apparatus to its full east position, and vertical drive motor 70 lowers the reflector apparatus to its closed position, either automatically when phototransistor 240 fails to detect sufficient sunlight or manually when the user operates toggle switch 316.

Briefly referring to FIGS. 16 and 17, it will be recalled that photosensors 232 and 234 are used to track east-to-west movements of the sun. As shown in FIG. 21, photodiode 232 is coupled between power supply conductor 346 and ground by a resistor-divider network including resistors 380 and 382. In addition, variable resistor 384 is coupled in parallel with resistor 382 for allowing for adjustments to the sensitivity of the tracking circuitry.

Similarly, photodiode 234 is coupled between power supply conductor 346 and ground by a resistor-divider network including resistors 386 and 388. Variable resistor 390 is provided for further permitting adjustments to the sensitivity of the tracking circuitry. The photodiodes 232 and 234, in conjunction with their associated resistor-divider networks, are coupled via series input resistors 392 and 394, respectively, to the non-inverting and inverting input terminals of differential amplifier 396. A positive feedback resistor 398 couples the output terminal of differential amplifier 396 to the non-inverting input terminal thereof. Load resistor 400 additionally couples the output terminal of differential amplifier 396 to power supply conductor 346.

Provided that photodiodes 232 and 234 receive approximately the same amount of sunlight, the voltages supplied to the non-inverting and inverting input terminals of differential amplifier 396 are approximately equal, as a result of which the voltage established at the output terminal of amplifier 396 is near ground potential. However, when photodiode 234 becomes shaded due to westwardly movements of the sun, photodiode 234 becomes less conductive, and as a result, the input voltage at the inverting terminal of amplifier 396 falls relative to the input voltage at the non-inverting input terminal thereof. The offset between the voltages at the non-inverting and inverting input terminals is amplified and is provided as a positive voltage at the output terminal of amplifier 396. Diode 402 has its anode terminal coupled to the output of differential amplifier 396 and its cathode terminal coupled to node 404. Node 404 is in turn coupled through mercury switch 224 to the base terminal of switching transistor 406. The emitter terminal of transistor 406 is grounded, while the collector terminal thereof is coupled through relay coil 408 to conductor 300. When the output voltage of differential amplifier 396 rises to a positive voltage, switching transistor 406 is biased into conduction for drawing current through relay coil 408, thereby positioning relay switch 294 in the position for supplying electrical power to the forward terminal of horizontal drive motor 174. As a result, the reflector apparatus is rotated toward the west to follow movements of the sun. Mercury switch 224 merely serves to prevent the conduction of switching transistor 406 until the reflector apparatus has been raised to its opened position such that photodiodes 232 and 234 are directed upwardly toward the sun.

While the tracking circuitry described thus far is suitable for controlling horizontal drive motor 174, the control circuitry preferably includes additional circuitry to prevent horizontal drive motor 174 from being actuated at frequent intervals for relatively short periods of time. This additional circuitry provides a time delay feature which causes horizontal drive motor 174 to continue rotating to the west for approximately one second beyond the time required to rotate the reflector apparatus to reestablish the balanced condition of photodiodes 332 and 334. Accordingly, horizontal drive motor 174 is actuated less frequently and operates more efficiently.

The delay feature described immediately above is provided via a time delay circuit 408 which is appropriately connected between power supply conductor 346 and ground. Integrated circuit 408 includes a trigger input capacitively coupled by capacitor 410 to the output terminal of a comparator 412. Load resistor 414 couples the output terminal of comparator 412 to power supply conductor 346. The inverting (or reference) input terminal of comparator 412 is maintained one diode voltage above ground potiential by diode 416 and biasing resistor 418. The non-inverting input terminal of comparator 412 is coupled to the output terminal of differential amplifier 396.

When the voltage at the output of differential amplifier 396 drops from voltage back toward ground, a similar negative edge appears upon the voltage at the output terminal of comparator 412. This negative edge is coupled to the trigger input of time delay IC 408. Upon being triggered by the negative input edge, the output terminal (pin 3) of IC 408 rises to a positive voltage which is maintained for the designated time delay, as determined by the values for resistor 420 and capacitor 422. The positive voltage at the output terminal of time delay IC 408 is coupled by resistor 424 to node 404 in order to maintain switching transistor 406 in conduction for approximately one second beyond the time at which the voltage at the output terminal of differential amplifier 396 returns to ground.

Those skilled in the art will now appreciate that a tracking reflector apparatus as has been described which may be used in conjunction with conventional skylights to illuminate the interior of a building while simultaneously providing electrical power from photovoltaic panels which track daily movements of the sun along with the reflector apparatus. The described reflector apparatus is of relatively inexpensive construction, is easily erected upon a roof of a building, and forms a relatively compact structure which may be easily packaged and shipped to the location where it will be used. The described apparatus eliminates the need to route electrical conduit to the roof of the building for powering the reflector apparatus and eliminates fire and shock hazards by using only relatively low voltage direct current components. The self contained photovoltaic panels allow the reflector apparatus to continue operating in the event of a power outage and further permit the reflector apparatus to be used in remote locations to which conventional utility power lines do not extend. The described apparatus further includes an improved wind detection apparatus for detecting the presence of dangerously high wind conditions and closing the reflector apparatus in response thereto.

While the present invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A solar lighting reflector apparatus for illuminating the interior of a roofed building during daylight hours and adapted to track daily movements of the sun, said solar lighting reflector apparatus being further adapted to generate electrical power, the roofed building having a light transmissive opening in the roof therein, said apparatus comprising in combination:
   (a) a lower frame member having a central opening substantially commensurate in size with said light transmissive opening, said lower frame member having opposing front and rear portions;
   (b) support means coupled to the roof of the building for supporting said lower frame member above said light transmissive opening in a generally horizontal position, said support means permitting said lower frame member to rotate in a substantially horizontal plane;
   (c) a reflective surface for reflecting solar light through said light transmissive opening;
   (d) an upper frame member for supporting said reflective surface, said upper frame member having opposing front and rear portions, the rear portion of said upper frame member being pivotally coupled to the rear portion of said lower frame member between a substantially horizontal closed position wherein said reflective surface overlies and shades said light transmissive opening and an upwardly extending opened position wherein said reflective surface reflects solar light through said light transmissive opening;
   (e) motor means for rotating said lower frame member and for pivoting said upper frame member between said said opened and closed positions;
   (f) control means coupled to said motor means and responsive to the presence and position of the sun for causing said motor means to track daily movements of the sun;
   (g) at least one photovoltaic panel coupled to said lower frame member for rotation therewith and for allowing said photovoltaic panel to track daily movements of the sun, said photovoltaic panel being disposed at an angle for generally facing the sun and directly receiving solar light whenever solar light is reflected by said reflective surface through said light transmissive opening, said photovoltaic panel providing electrical power when illuminated by solar light; and (h) means electrically coupled to said at least one photovoltaic panel for deriving electrical power therefrom.

2. An apparatus as recited by claim 1 wherein said control means and said motor means require electrical power in order to operate, and wherein said means electrically coupled to said photovoltaic panel is also electrically coupled to said control means and to said motor means for providing electrical power thereto.

3. An apparatus as recited by claim 2 wherein said means electrically coupled to said photovoltaic panel is a storage battery.

4. An apparatus as recited by claim 1 wherein said lower frame member has a generally rectangular shape and includes opposing first and second side portions extending between said front and rear portions thereof, said at least one photovoltaic panel being disposed adjacent to one of said first and second side portions.

5. An apparatus as recited by claim 4 wherein said upper frame member has a generally rectangular shape and includes opposing first and second side portions extending between said front and rear portions thereof, said apparatus including at least one hinge for pivotally coupling the rear portion of said upper frame member to the rear portion of said lower frame portion.

6. A solar lighting reflector apparatus for illuminating the interior of a roofed building during daylight hours and adapted to track daily movements of the sun, said solar lighting reflector apparatus being further adapted to generate electrical power, the roofed building having a light transmissive opening in the roof therein, said apparatus comprising in combination:

(a) a lower frame member having a central opening substantially commensurate in size with said light transmissive opening, said lower frame member having opposing front and rear portions, said lower frame member having a generally rectangular shape and including opposing first and second side portions extending between said front and rear portions thereof;

(b) support means coupled to the roof of the building for supporting said lower frame member above said light transmissive opening in a generally horizontal position, said support means permitting said lower frame member to rotate in a substantially horizontal plane;

(c) a reflective surface for reflecting solar light through said light transmissive opening;

(d) an upper frame member for supporting said reflective surface, said upper frame member having opposing front and rear portions, the rear portion of said upper frame member being pivotally coupled to the rear portion of said lower frame member between a substantially horizontal closed position wherein said reflective surface overlies and shades said light transmissive opening and an upwardly extending opened position wherein said reflective surface reflects solar light through said light transmissive opening, said upper frame member having a generally rectangular shape and including opposing first and second side portions extending between said front and rear portions thereof, said apparatus including at least one hinge for pivotally coupling the rear portion of said upper frame member to the rear portion of said lower frame portion;

(e) motor means for rotating said lower frame member and for pivoting said upper frame member between said opened and closed positions;

(f) control means coupled to said motor means and responsive to the presence and position of the sun for causing said motor means to track daily movements of the sun;

(g) at least one photovoltaic panel disposed adjacent to one of said first and second side portions of said lower frame member and coupled to said lower frame member for rotation therewith and for allowing said photovoltaic panel to track daily movements of the sun, said photovoltaic panel being disposed at an angle for generally facing the sun whenever solar light is reflected by said reflective surface through said light transmissive opening, said photovoltaic panel providing electrical power when illuminated by solar light, said at least one photovoltaic panel having upper and lower opposing ends;

(h) means electrically coupled to said at least one photovoltaic panel for deriving electrical power therefrom;

(i) pivotal connection means engaged with said at least one photovoltaic panel at a point remote from the lower end thereof for pivotally connecting said at least one photovoltaic panel to one of said first and second side portions of said upper frame member;

(j) a track secured to said lower frame member, said track extending parallel to and spaced apart from one of said first and second side portions of said lower frame member;

(k) sliding means for slidingly coupling the lower end of said at least one photovoltaic panel to said track; and (l) said pivotal connection means and said sliding means causing said at least one photovoltaic panel to assume an essentially horizontal position when said upper frame member is in said closed position and causing said at least one photovoltaic panel to be disposed at an upwardly inclined angle relative to the lower end thereof when said upper frame member is in said opened position.

7. An apparatus as recited by claim 6 further including a hinge for hingedly coupling the lower end of said at least one photovoltaic panel to said sliding means.

8. A solar lighting reflector apparatus for illuminating the interior of a roofed building during daylight hours and adapted to track daily movements of the sun, said solar lighting reflector apparatus being further adapted to generate electrical power, the roofed building having a light transmissive opening in the roof therein, said apparatus comprising in combination:

(a) a lower frame member having a central opening substantially commensurate in size with said light transmissive opening, said lower frame member having opposing front and rear portions;

(b) support means coupled to the roof of the building for supporting said lower frame member above said light transmissive opening in a generally horizontal position, said support means permitting said lower frame member to rotate in a substantially horizontal plane;

(c) a reflective surface for reflecting solar light through said light transmissive opening;

(d) an upper frame member for supporting said reflective surface, said upper frame member having opposing front and rear portions, the rear portion of said upper frame member being pivotally coupled to the rear portion of said lower frame member between a substantially horizontal closed position wherein said reflective surface overlies and shades said light transmissive opening and an upwardly extending opened position wherein said reflective surface reflects solar light through said light transmissive opening;

(e) motor means for rotating said lower frame member and for pivoting said upper frame member between said opened and closed positions, said motor means including:
   (i) a vertical drive arm having first and second ends, the first end thereof being pivotally coupled to the front portion of said lower frame member, said vertical drive arm having a toothed gear rack extending between the first and second ends thereof;
   (ii) a vertical drive electric motor secured to said upper frame member proximate the front portion thereof;
   (iii) a drive gear coupled to and rotated by said vertical drive electric motor; and
   (iv) means for slidingly engaging said vertical drive arm and maintaining said drive gear in engagement with said toothed gear rack of said vertical drive arm for causing said upper frame member to be raised or lowered when said vertical drive electric motor rotates said drive gear;

(f) control means coupled to said motor means and responsive to the presence and position of the sun for causing said motor means to track daily movements of the sun;

(g) at least one photovoltaic panel coupled to said lower frame member for rotation therewith and for allowing said photovoltaic panel to track daily movements of the sun, said photovoltaic panel being disposed at an angle for generally facing the sun whenever solar light is reflected by said reflective surface through said light transmissive opening, said photovoltaic panel providing electrical power when illuminated by solar light; and (h) means electrically coupled to said at least one photovoltaic panel for deriving electrical power therefrom.

9. An apparatus as recited by claim 8 wherein said control means includes switch means for detecting when said upper frame member has been raised to its opened position or lowered to its closed position and for deactivating said vertical drive electric motor in response thereto.

10. A solar lighting reflector apparatus for illuminating the interior of a roofed building during daylight hours and adapted to track daily movements of the sun, said solar lighting reflector apparatus being further adapted to generate electrical power, the roofed building having a light transmissive opening in the roof therein, said apparatus comprising in combination:

(a) a lower frame member having a central opening substantially commensurate in size with said light transmissive opening, said lower frame member having opposing front and rear portions, said lower frame member having a generally rectangular shape and including opposing first and second side portions extending between said front and rear portions thereof;

(b) support means coupled to the roof of the building for supporting said lower frame member above said light transmissive opening in a generally horizontal position, said support means permitting said lower frame member to rotate in a substantially horizontal plane;

(c) a reflective surface for reflecting solar light through said light transmissive opening;

(d) an upper frame member for supporting said reflective surface, said upper frame member having opposing front and rear portions, the rear portion of said upper frame member being pivotally coupled to the rear portion of said lower frame member between a substantially horizontal closed position wherein said reflective surface overlies and shades said light transmissive opening and an upwardly extending opened position wherein said reflective surface reflects solar light through said light transmissive opening;

(e) motor means for rotating said lower frame member and for pivoting said upper frame member between said opened and closed positions;

(f) control means coupled to said motor means and responsive to the presence and position of the sun for causing said motor means to track daily movements of the sun;

(g) a first plurality of photovoltaic panels disposed adjacent to said first side portion of said lower frame member, said apparatus including a first bracket for supporting said first plurality of photovoltaic panels, said bracket being secured to said lower frame member for rotation therewith and for allowing said photovoltaic panels to track daily movements of the sun, said first bracket supporting each of said first plurality of photovoltaic panels at an upwardly and rearwardly inclined angle for facing the sun whenever solar light is reflected by said reflective surface through said light transmissive opening, said first plurality of photovoltaic panels providing electrical power when illuminated by solar light; and (h) means electrically coupled to said first plurality of photovoltaic panels for deriving electrical power therefrom.

11. An apparatus as recited by claim 10 including a second plurality of photovoltaic panels disposed adjacent to said second side portion of said lower frame member, said apparatus including a second bracket for supporting said second plurality of photovoltaic panels, said second bracket being secured to said lower frame member for rotation therewith, said second bracket supporting each of said second plurality of photovoltaic panels at an upwardly inclined angle for facing the sun.

12. An apparatus as recited by claim 10 further including at least one support wheel coupled to and disposed below said first bracket and adapted to rest upon and roll across the roof of said roofed building for rotatably supporting said first plurality of photovoltaic panels.

13. A solar lighting reflector apparatus for illuminating the interior of a roofed building during daylight hours and adapted to track daily movements of the sun, said solar lighting reflector apparatus being further adapted to generate electrical power, the roofed building having a light transmissive opening in the roof therein, said apparatus comprising in combination:

(a) a lower frame member having a central opening substantially commensurate in size with said light transmissive opening, said lower frame member having opposing front and rear portions;

(b) support means coupled to the roof of the building for supporting said lower frame member above said light transmissive opening in a generally horizontal position, said support means permitting said lower frame member to rotate in a substantially horizontal plane, said support means including:
  (i) a ring secured to said lower frame member; and
  (ii) a plurality of rollers secured to said roofed building and disposed about said light transmissive opening for engaging said ring and rotatably supporting said lower frame member;
(c) a reflective surface for reflecting solar light through said light transmissive opening;
(d) an upper frame member for supporting said reflective surface, said upper frame member having opposing front and rear portions, the rear portion of said upper frame member being pivotally coupled to the rear portion of said lower frame member between a substantially horizontal closed position wherein said reflective surface overlies and shades said light transmissive opening and an upwardly extending opened position wherein said reflective surface reflects solar light through said light transmissive opening;
(e) motor means for rotating said lower frame member and for pivoting said upper frame member between said opened and closed positions;
(f) control means coupled to said motor means and responsive to the presence and position of the sun for causing said motor means to track daily movements of the sun;
(g) at least one photovoltaic panel coupled to said lower frame member for rotation therewith and for allowing said photovoltaic panel to track daily movements of the sun, said photovoltaic panel being disposed at an angle for generally facing the sun whenever solar light is reflected by said reflective surface through said light transmissive opening, said photovoltaic panel providing electrical power when illuminated by solar light; and
(h) means electrically coupled to said at least one photovoltaic panel for deriving electrical power therefrom.

14. An apparatus as recited by claim 13 further including at least one support wheel coupled to and disposed below said at least one photovoltaic panel and adapted to rest upon and roll across the roof of said roofed building for rotatably supporting said at least one panel.

15. An apparatus as recited by claim 13 wherein said ring includes a toothed gear rack extending at least partially around said ring, and wherein said motor means includes a horizontal drive electric motor coupled to the roof of said building, said motor means also including a drive gear coupled to and rotated by said horizontal drive electric motor, said drive gear being engaged with said toothed gear rack of said ring for rotating said ring and said lower frame member secured thereto.

16. An apparatus as described by claim 15 wherein said control means includes photosensor means disposed proximate the front portion of said upper frame member for detecting east-to-west movements of the sun, said control means being responsive to said photosensor means for actuating said horizontal drive electric motor periodically to maintain the front portions of said upper and lower frame members directed toward the sun.

17. A solar lighting reflector apparatus for illuminating the interior of a roofed building during daylight hours and adapted to rack daily movements of the sun, the roofed building having a light transmissive opening in the roof therein, said apparatus comprising in combination:
  (a) a lower frame member having a central opening substantially commensurate in size with said light transmissive opening, said lower frame member having opposing front and rear portions;
  (b) support means coupled to the roof of the building for supporting said lower frame member above said light transmissive opening in a generally horizontal position, said support means permitting said lower frame member to rotate in a substantially horizontal plane;
  (c) a reflective surface for reflecting solar light through said light transmissive opening;
  (d) an upper frame member for supporting said reflective surface, said upper frame member having opposing front and rear portions, the rear portion of said upper frame member being pivotally coupled to the rear portion of said lower frame member between a substantially horizontal closed position wherein said reflective surface overlies and shades said light transmissive opening and an upwardly extending opened position wherein said reflective surface reflects solar light through said light transmissive opening;
  (e) motor means for rotating said lower frame member and for pivoting said upper frame member between said opened and closed positions; and
  (f) control means coupled to said motor means and responsive to the presence and position of the sun for causing said motor means to track daily movements of the sun, said control means including a sensor means for deactivating said solar lighting reflector apparatus upon the occurrence of darkness or dangerously high winds, said sensor means comprising:
    (i) a vertically oriented tubular member having an upper end;
    (ii) a light transmissive lens closing the upper end of said tubular member, said light transmissive lens having upper and lower faces;
    (iii) a photosensor secured to the lower face of said light transmissive lens, said photosensor providing an electrical signal representing the amount of light received thereby;
    (iv) a wind vane rotatably mounted to said tubular member for rotation in a horizontal plane, said wind vane being disposed below and proximate to the upper end of said tubular member, said wind vane assuming a position determined by the direction of the wind;
    (v) a flap having a lower portion pivotally coupled to said wind vane, said wind vane generally maintaining said flap between said tubular member and the direction from which the wind is coming, said flap having an upper portion of an area commensurate with the area of said lens, the wind tending to rotate said flap about its pivotal coupling for causing the upper portion of said flap to cover said lens and to shade said photosensor; and
    (vi) biasing means for biasing said flap away from said lens during winds of less than a predetermined speed.

18. An apparatus as recited by claim 17 wherein said biasing means is a weight secured to the lower portion of said flap.

* * * * *